US012594490B2

(12) United States Patent
Henderson

(10) Patent No.: US 12,594,490 B2
(45) Date of Patent: Apr. 7, 2026

(54) CONTROL DEVICE, SYSTEM AND METHOD

(71) Applicant: Sony Interactive Entertainment Inc., Tokyo (JP)

(72) Inventor: Christopher W. Henderson, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 419 days.

(21) Appl. No.: 18/155,857

(22) Filed: Jan. 18, 2023

(65) Prior Publication Data

US 2023/0233928 A1 Jul. 27, 2023

(30) Foreign Application Priority Data

Jan. 27, 2022 (GB) ..................................... 2201035

(51) Int. Cl.
| *A63F 13/21* | (2014.01) |
| *A63F 13/235* | (2014.01) |
| *A63F 13/24* | (2014.01) |
| *A63F 13/42* | (2014.01) |

(52) U.S. Cl.
CPC ............ *A63F 13/235* (2014.09); *A63F 13/21* (2014.09); *A63F 13/24* (2014.09); *A63F 13/42* (2014.09)

(58) Field of Classification Search
None
See application file for complete search history.

(56) References Cited

U.S. PATENT DOCUMENTS

| 5,128,671 | A | 7/1992 | Thomas, Jr. | |
| 6,130,664 | A | 10/2000 | Suzuki | |
| 2004/0017473 | A1* | 1/2004 | Marks | G06F 3/0304 |
| | | | | 348/207.1 |
| 2005/0143173 | A1 | 6/2005 | Barney | |
| 2011/0134034 | A1 | 6/2011 | Daniel | |
| 2013/0027341 | A1 | 1/2013 | Mastandrea | |
| 2014/0002390 | A1 | 1/2014 | Lee | |
| 2016/0231819 | A1* | 8/2016 | Chavez | G06F 3/016 |
| 2017/0354864 | A1 | 12/2017 | Rogers | |
| 2019/0291000 | A1 | 9/2019 | Campbell | |
| 2019/0325651 | A1 | 10/2019 | Bradner et al. | |
| 2021/0283494 | A1* | 9/2021 | Lee | A63F 13/24 |
| 2022/0096923 | A1* | 3/2022 | O'Leary | A63F 13/92 |

FOREIGN PATENT DOCUMENTS

| EP | 3406308 A1 | 11/2018 |
| EP | 1852163 B1 | 8/2020 |
| JP | 2005339088 A | 12/2005 |
| WO | WO 2021192115 A1 | 9/2021 |

OTHER PUBLICATIONS

Extended European Search Report for corresponding EP Application No. 23151160.1, 9 pages, dated Jun. 7, 2023.
Combined Search and Examination Report for corresponding GB Application No. 2201035.9, 6 pages, dated Jul. 26, 2022.

\* cited by examiner

*Primary Examiner* — Damon J Pierce
(74) *Attorney, Agent, or Firm* — Fish & Richardson P.C.

(57) ABSTRACT

A control device includes one or more sensors to detect motion of the control device in at least three spatial axes, a wireless communication unit to transmit tracking information indicative of the detected motion and an exterior surface having no more than three user-actuated inputs.

15 Claims, 4 Drawing Sheets

200

250

200

L

260

500

CONTROL DEVICE, SYSTEM AND METHOD

BACKGROUND OF THE INVENTION

Field of the Invention

The present disclosure relates to control devices, systems and methods for controlling one or more processing operations.

Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Computer input devices for allowing users to provide inputs for interacting with computer based devices come in a range of different forms that are typically adapted for a given use case. Examples of such devices include mouse-type pointing devices to control a pointer on a screen, keyboards, touchpads, touch screens, joysticks and various handheld video game controllers, such as the Sony® DualShock® 5.

Video game controllers for use in providing inputs to control execution of a video game are increasingly being developed to provide an ever broader range of functions allowing use of the controller with different video games. An example of this is a conventional video game controller that comprises control sticks, a directional pad (also referred to as a d-pad), multiple buttons as well as potentially image tracking capabilities.

Attempts to develop controllers providing an ever broader range of functions have resulted in modern day controllers becoming increasingly expensive and sophisticated, and in some cases with a larger footprint.

It is in the context of the above arrangements that the presently disclosure arises.

SUMMARY OF THE INVENTION

Various aspects and features of the present invention are defined in the appended claims and within the text of the accompanying description.

BRIEF DESCRIPTION OF THE DRAWINGS

The present technique will be described further, by way of example only, with reference to embodiments thereof as illustrated in the accompanying drawings, in which.

DESCRIPTION OF THE EMBODIMENTS

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
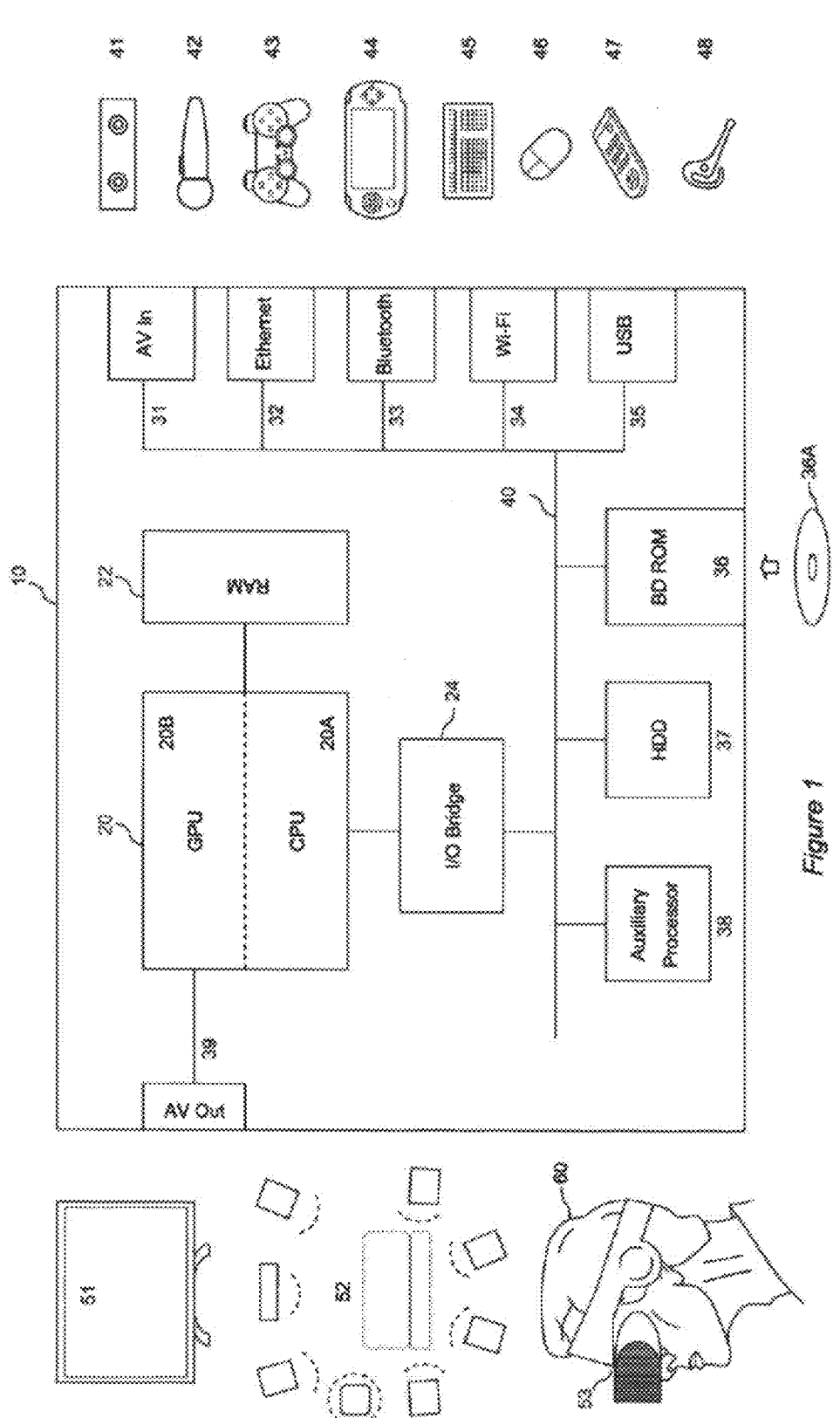
FIG. 1 is a schematic diagram illustrating a computer game processing apparatus.

Referring now to the drawings, wherein like reference numerals designate identical or corresponding parts throughout the several views, FIG. 1 schematically illustrates the overall system architecture of a computer game processing apparatus such as the Sony® PlayStation 4® entertainment device. A system unit 10 is provided, with various peripheral devices connectable to the system unit using one or more of a wired or wireless connection.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet port 32, a Bluetooth wireless link 33, a Wi-Fi wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move and conventional handheld videogame controllers 43 such as the DualShock 4 ®; portable entertainment devices 44 such as the PlayStation Portable and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, processes data and generates video images (image data) and optionally audio for output via the AV output 39. Optionally, the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a data processing apparatus suitable for performing one or more processing operations for an application such as a video game.

Figures 2A, 2B:
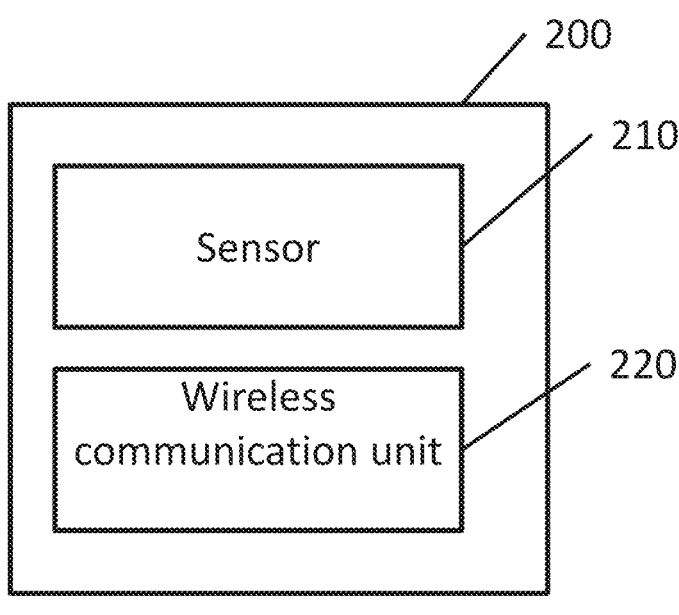
FIGS. 2a and 2b are schematic diagrams illustrating a control device.

FIG. 2a schematically illustrates a control device 200 comprising one or more sensors 210 and a wireless communication unit 220. In embodiments of the disclosure, the control device 200 comprises one or more sensors 210 to detect motion of the control device in at least three spatial axes; a wireless communication unit 220 to transmit tracking information indicative of the detected motion; and an exterior surface having no more than three user-actuated inputs.

The control device 200 comprises one or more sensors 210 operable to detect motion of the control device 210 with respect to at least three spatial axes, and the wireless communication unit 220 is operable to transmit tracking information indicative of the motion detected for the control device 200 by the one or more sensors 210. Hence, movement (and thus relative changes in a 3D position and/or a 3D orientation) of the control device 200 is tracked, and information indicative of the tracked movement with respect to at least three spatial axes is wirelessly communicated by the control device 200, via the wireless communication unit 220, using a wireless communication such as Bluetooth® or Wi-Fi®, for example.

The one or more sensors 210 are operable to detect motion of the control device 200 and may comprise one or more from the list consisting of: one or more gyroscopes, one or more accelerometers and one or more magnetometers. Other sensors may similarly be considered. Generally, the one or more sensors 211 may comprise one or more sensors operable to detect relative changes in a magnetic field and/or one or more sensors operable to detect a magnitude and a direction of acceleration in its own rest frame and operable to generate information in dependence upon a detected change in one or more such detected properties.

The control device 200 is capable of being moved with respect to three-dimensional space due to at least one of translational movement (left/right, back/forth, up/down) causing changes in position with respect to three orthogonal spatial axes and rotational movement (yaw, pitch, roll) causing changes in orientation with respect to three orthogonal spatial axes. The control device 200 may for example be a handheld control device suitable for being held by a user's hand to allow user-controlled movement of the control device. Alternatively, the control device 200 may for example be a wearable control device such as a wristband or smartwatch such that the control device 200 is reliably secured to a user's body part and moves according to movements performed by the body part.

Hence, the control device 200 can be moved by a user and changes in a three-dimensional position with respect to three spatial axes and/or a three-dimensional orientation with respect to three spatial axes can be tracked. The one or more sensors 210 are thus operable to detect motion of the control device 200 indicative of a relative change in a 3D position of the control device 200 with respect to three spatial axes and/or a relative change in a 3D orientation of the control device 200 with respect to three spatial axes.

Hence more generally, the control device 200 comprises one or more sensors 210 to detect motion of the control device in at least three spatial axes and generate an output according to the detected motion. The output is indicative of a change in at least one of a three-dimensional position and a three-dimensional orientation for the control device. The one or more sensors 210 are thus capable of at least three degrees of freedom (3DOF) tracking and optionally six degrees of freedom (6DOF) tracking. The tracking information is thus indicative of relative changes in motion with respect to three translational coordinates and/or relative changes in motion with respect to three rotational angles.

In some embodiments of the disclosure, the one or more sensors 210 comprise a three-axis accelerometer (optionally being an MEMS accelerometer) and a three-axis gyroscope. The three-axis accelerometer can be used to detect changes in position with respect to three spatial axes and the three-axis gyroscope can be used to detect changes in orientation with respect to three spatial axes for providing six degrees of freedom (6DOF) tracking.

In some embodiments of the disclosure, the control device 200 optionally comprises one or more optically detectable markers on an exterior surface for use in optical based tracking of the control device 200. One or more cameras arranged with respect to the control device 200 (such as a camera associated with a game console and typically arranged to capture images of a user whilst playing a video game) can be used to capture one or more images including one or more of the optically detectable markers. As such, optical tracking information for the control device 200 may also be used in addition to the tracking information transmitted by the wireless communication unit 220. For example, a processing device such as that shown in FIG. 1 may receive the tracking information transmitted by the wireless communication unit 220 and also received optical-based tracking information from one or more camera devices and fuse the information for tracking the control device 200.

The wireless communication unit 220 is operable to transmit the tracking information indicative of the detected motion via a wireless communication (such as Bluetooth® or Wi-Fi® or Zigbee®) for reception by a data processing apparatus such that the tracking information can be used in one or more data processing operations. The tracking information indicative of motion with respect to at least three axes (and optionally with respect to six axes) is thus wirelessly communicated from the control device 200 either directly to a processing device such as a games console or other entertainment device, or indirectly to such a processing device via one or more intermediate devices.

The exterior surface includes one or more portions suitable for being grasped by a user's hand when the control device 200 is provided as a handheld control device. In some cases, the control device 200 may be provided as a wearable control device, such as a wristband or smartwatch, in which case the exterior surface may comprise one or more portions suitable for attaching to an attachment structure (e.g. a strap for a watch) for releasably securing the device to a body part.

The exterior surface of the control device 200 may comprise a rigid structure made from a suitable material such that the exterior surface acts as both a protective shell (casing) to protect the components of the control device 200 whilst also providing one or more shaped portions having a shape that facilitates gripping of the device 200 by a user's hand. Alternatively or in addition, the exterior surface of the control device 200 may comprise a rigid structure and also one or more deformable structures such that one or more parts of the exterior surface are capable of being temporarily deformed when pressed by a user's hand.

The exterior surface includes no more than three user-actuated inputs thereon. Whereas conventional handheld controllers comprise a large number of user-actuated inputs such as a directional pad (d-pad) including four or more buttons, two or more control sticks, trigger buttons as well as other buttons presented on an external surface for use by a user, the control device 200 has an exterior surface having no more than three input units arranged thereon that are capable of being actuated by a user. The exterior surface of the control device 200 may thus have: no more than three user-actuated inputs thereon; no more than two user-actuated inputs thereon; no more than one user-actuated input thereon; or no user-actuated input thereon. Put differently, the exterior surface of the control device 200 may include three user-actuated inputs, two user-actuated inputs, one user-actuated input or no user-actuated input.

Examples of user-actuated inputs that may be provided on the exterior surface of the control device 200 for use by a user using one or more digits of their hand, include one or more from the list consisting of: an external pressable button having either an activated state or a deactivated state; an external pressable button comprising one or more pressure sensors to generate information indicative of a magnitude of a pressure applied to the button; an analog control stick; and a touch pad. In some examples, the exterior surface may have an analog control stick comprising one or more from the list consisting of a joystick comprising one or more potentiometers and a pointing stick. The pointing stick comprises a nub (e.g. a substantially flat or dome shaped surface) that is contactable by a user's digit and at least two strain gauges operable to generate an output signal in dependence upon a change in resistance for the strain gauges caused by the pressure exerted by the user's digit on the nub. Hence, the pointing stick is operable to generate an output indicative of a 2D position on the surface of the nub at which the user's exerted pressure is concentrated and such an input is suitable for providing a pointing input for controlling an on-screen cursor for example.

As explained previously, the control device 200 may be a handheld control device or a wearable control device. In the case of a wearable control device 200, the device 200 comprises one or more attachment structures for receiving one or more straps suitable for releasably attaching the device to a user's body part. For example, the control device 200 may be a watch-type device operable to be worn on a user's wrist, forearm or upper arm. Alternatively or in addition, the control device 200 may be operable to be worn on a user's upper or lower leg. In some examples, a user may wear a plurality of the control devices 200 attached to various body parts so that movements of the body parts can be tracked (using one or more sensors 210 included in a respective control device 200) and optionally the user may actuate one or more user-actuated inputs of a respective control device to provide a user-actuated input via one of the control devices 200.

For example, the user may wear a plurality of control devices 200 (e.g. one on each limb, or one on a lower part of each limb and one on an upper part of each limb) and the user may view (and/or listen to) an exercise routine via a playback device (such as a game console connected to a display unit) and perform one or more body movements for the exercise routine, such that the movements can be tracked by the control devices 200 and corresponding tracking information is communicated to the game console for controlling one or more processing operations as part of the application being executed for the exercise routine. In addition to performing the movements, the user may also provide a user input via a user-actuated input of a given control device 200, so that both tracking information and a user input associated with a user-actuated input can be used by the game console for controlling one or more processing operations. For example, as part of an exercise routine, the user may view an on-screen character (e.g. real person or a virtual avatar) performing an exercise of an exercise routine and perform one or more corresponding movements to perform the exercise and provide an input via a user-actuated input either as part of a request by the on-screen character or to indicate completion of the exercise. As part of an exercise involving touching toes, for example, a user may indicate completion by pressing a pressable button included on an exterior surface of a control device 200 worn on the user's lower leg or the user's ankle.

In some examples, the control device 200 may be a handheld control device 200 specifically intended for use solely as a handheld control device. In other examples, the control device 200 may have an exterior surface that includes attachment means so that the control device 200 may be used as a handheld control device 200 when desired and instead used as a wearable control device 200 when desired by attaching the device using one or more of the attachment means and a suitable strap.

FIG. 2b schematically illustrates examples of shapes of the exterior surface of the control device 200. In FIG. 2b, an example of a spherical shape 250 for the external surface is shown and an alternative example of a cubic shape 260 for the external surface is shown. In some embodiments of the disclosure, the control device 200 is a handheld control device and the exterior surface has a shape that is one from the list consisting of: i. spherical or substantially spherical; ii. cubic or substantially cubic; and iii. ovoidal.

The exterior surface is shown in FIG. 2b as being spherical 250 such that the control device 200 can be grasped and handled by a user like when handling a ball. The exterior surface may thus have a spherical or substantially spherical shape with a diameter preferably in the range 30 cm to 1 cm, and more preferably in the range 10 cm to 3 cm. The control device having a spherical or substantially spherical shape may be used in one or more ball-type games played using an interactive application so that the control device 200 can be thrown and/or rolled. However, more generally the use of an exterior surface having a spherical or substantially spherical shape provides a user with a compact, easy to hold and low-weight input device for instructing one or more processing operations using at least tracking information to provide gesture-based inputs and optionally using information indicative of an input from an actuated-user input operable by a user's digit. The control device 200 can thus be handled by a user and used to provide one or more inputs based on at least the tracking information communicated by the wireless communication unit 220.

The exterior surface is shown in FIG. 2b as being cubic 260 such that the control device 200 can be grasped and handled by a user and easily placed to rest on a surface. The exterior surface may thus have a cubic or substantially cubic shape (e.g. cuboid) having 6 faces with each face having at least one axis with a length L that is preferably in the range 30 cm to 1 cm, and more preferably in the range 10 cm to 3 cm. Hence, the control device 200 may be considered to be a "Cube Control Device" that can be grasped by a user's hand and/or worn on a user's body part to allow the tracked movements of the device to be used for controlling one or more processing operations. Of course, whilst the exterior surface may have a cubic or substantially cubic shape, other three-dimensional shapes are also considered including a polyhedron with N faces, where N is a value in the range 4 to 20. For example, the exterior surface may have a shape of a tetrahedron or a pentahedron. The exterior surface may have a shape of a triangular prism or a truncated cube.

Specifically, a truncated cube shape may be used for some or all of the vertices of the cube 260 shown in FIG. 2*b*. A truncated cube shape may be more beneficial than using the cube shape 260 as it generally rolls more easily than a cube which may be beneficial when the control device 200 is be used for certain types of video game.

The exterior surface may have an ovoidal shape similar to that of a ball used in American football or rugby football, or similar to an egg, or the ovoidal shape may be somewhere between these shapes.

Hence more generally the exterior may have a simple body shape like a Platonic solid, optionally truncated, a sphere, or an ovoid. This body shape may optionally be decorated in any suitable manner, optionally included so as to indicate a preferred holding position, and/or to identify a preferred position for squeezing or pressing any inputs internal to the body to activate them. Optionally the exterior may also have any suitable texture, such as smooth, rough, rubbery, or furry, and similarly optionally have one or more physical extensions such a nodules or limb-like structures. Meanwhile the exterior is not shaped, for example, like a gun, or a form factor with very different height, width, and depth values, such as a phone or tablet. Hence optionally the ratio between any pair of height, width and depth values (or similarly optionally between all three values) may be in the range 1:1 to 1:3, and more preferably in the range 1:1 to 1:2, and still more preferably in the range 1:1 to 1:1.5, and still more preferably in the range 1:1 to 1:1.2.

It will be appreciated the control device 200 has an exterior surface and that a portion of the exterior surface may have any of the above mentioned shapes, and that such a control device 200 may be used as either a handheld control device or as wearable device by using one or more attachment means to temporarily secure the control device 200 to the user's body.

In some embodiments of the disclosure, at least a portion of the exterior surface comprises an elastically deformable portion for being elastically deformed when gripped by a hand of a user. At least some or all of the exterior surface is elastically deformable so that a distance from the centre of the control device 200 to the surface of the elastically deformable portion is capable of being reduced when the elastically deformable portion is subjected to a gripping force (or more generally a compressive force) by a user. For example, the exterior surface may have the shape of a cube, in which the edges connecting the vertices are formed of rods or struts made of a rigid material (e.g. high-density polyethylene) and the exterior surface of the faces extending between the edges are made of an elastically deformable material (e.g. polyurethane foam rubber). In particular, a major portion (more than half) of each face may be made so as to be elastically deformable, or a minor portion (less than half) centred upon the centre of a face may be made to be elastically deformable and surrounded by a rigid material.

In other examples, the control device 200 may have an exterior surface that is a rigid casing (e.g. a housing made from high-density polyethylene) with one or more areas (e.g. relatively small square-shaped or circular-shaped areas) on the surface made of an elastically deformable material. In other examples, the control device 200 may have an exterior surface that is a rigid casing, in which the rigid casing houses an elastically deformable material that surrounds the components shown in FIG. 2*a* and the rigid casing comprises one or more cut-outs (apertures) via which the elastically deformable material is contactable by a user's digit.

Alternatively, the control device 200 may have an exterior surface that is entirely made of an elastically deformable material and which encloses the components shown in FIG. 2*a*. Materials such as those typically used in stress balls (e.g. polyurethane foam rubber) may be used as the elastically deformable material.

Hence more generally, at least a portion of the exterior surface of the control device 200 can be elastically deformable such that when the elastically deformable portion is pressed by a user's digit the portion is reversibly deformed and the portion of the surface returns to its original shape when the pressure is removed. This may be beneficial for improving gripping of the control device 200.

In some embodiments of the disclosure, the control device 200 comprises the one or more sensors 210, the wireless communication unit 220 and the exterior surface having an elastically deformable portion, and the exterior surface may or may not comprise a user-actuated input. The exterior surface having an elastically deformable portion may thus comprise a user-actuated input, but the exterior surface has no more than three user-actuated inputs. The user-actuated inputs are provided on the exterior surface so as to be capable of being activated by a user's digit when the user desires to provide an input such as a button press, a control stick input or touch pad input. For example, a user-actuated input on the exterior surface may be a button that is directly contactable by the user's digit to actuate the button. The control device 200 may further comprise one or more internal sensors, provided internally with respect to the exterior surface, for detecting a pressure applied to the elastically deformable portion that causes a change in shape of at least a portion of the exterior surface.

Figures 3, 4:
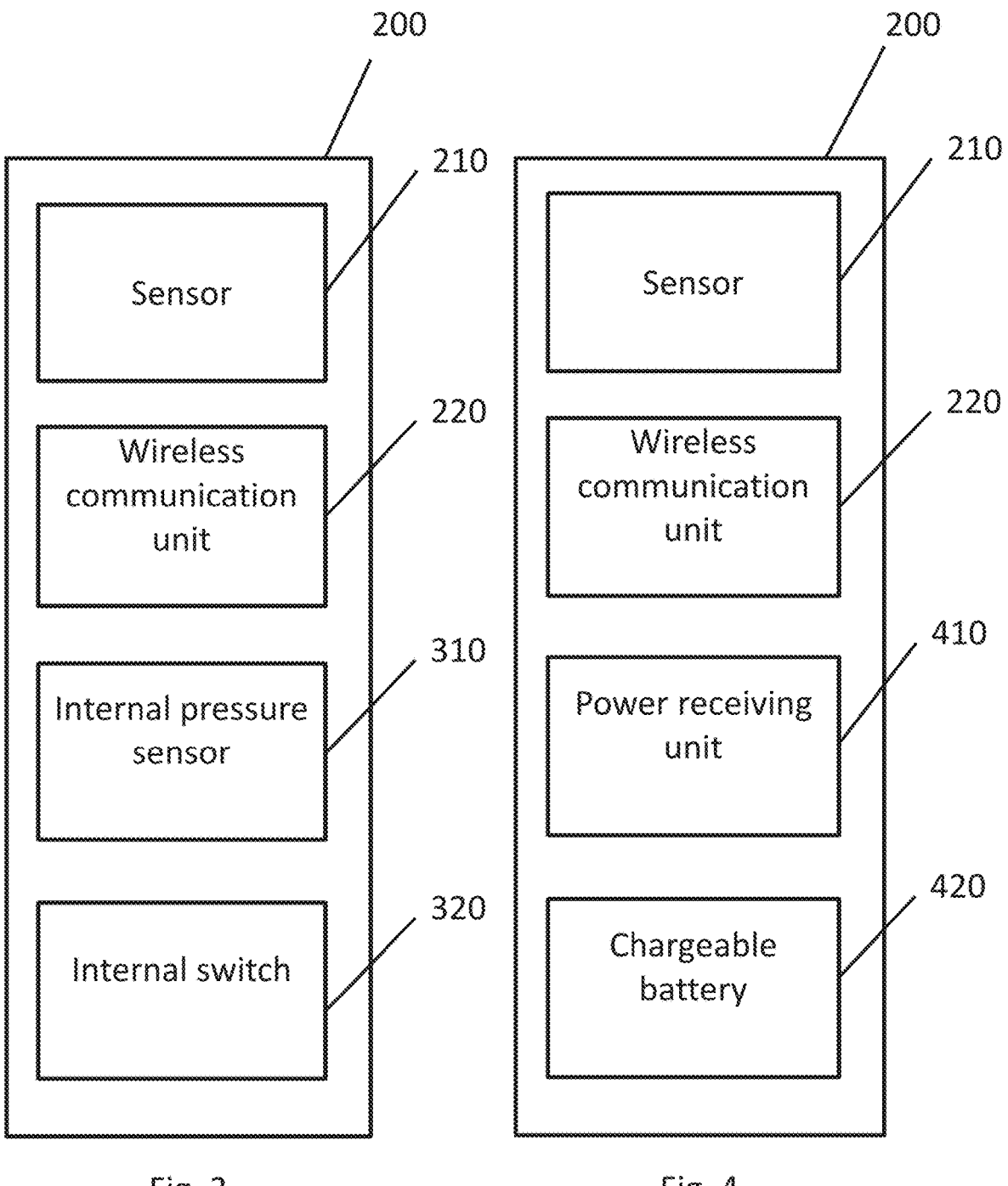
FIG. 3 is a schematic diagram illustrating a control device comprising an internal pressure sensor and/or an internal pressure sensitive switch.
FIG. 4 is a schematic diagram illustrating a control device for wireless charging.

Referring now to FIG. 3, in some embodiments of the disclosure the control device 200 comprises one or more from the list consisting of: an internal pressure sensor 310 for sensing a magnitude of a pressure applied to the elastically deformable portion of the exterior surface of the control device; and one or more internal pressure sensitive switches 320 configured to be actuated when at least a predetermined pressure is applied to the elastically deformable portion of the exterior surface of the control device. As explained above, at least some or all of the exterior surface can be made elastically deformable so that a distance from the centre of the control device 200 to the surface of the elastically deformable portion is capable of being reduced when the elastically deformable portion is subjected to a compressive force. The control device 200 may optionally comprises the internal pressure sensor 310 and/or the more internal pressure sensitive switch 320 for sensing a pressure applied to an elastically deformable portion of the exterior surface.

The control device 200 may comprise one or more internal pressure sensors 310 for sensing a magnitude of a pressure applied to the elastically deformable portion of the exterior surface and generating an output signal indicative of the magnitude of the applied pressure. Examples of pressure sensors that may be used for this purpose include one or more of: a capacitance pressure sensor, resistance pressure sensor, piezoresistive pressure sensor, piezoelectric pressure sensor, optical pressure sensor, and an elastoresistive pressure sensor. Hence more generally, a squeezing force (or other similar force) imparted by a user's hand to the exterior surface can be detected and the internal pressure sensor 310 is operable to generate information indicative of a magnitude of the applied pressure. Hence in addition to transmitting the tracking information indicative of the detected motion of the control device 200, the wireless communication unit 220 can also be configured to transmit pressure information indicative of the pressure sensed by the internal pressure sensor 310.

Optionally, the internal pressure sensor 310 may be configured to generate the pressure information (for transmission by the wireless communication unit 220) in dependence upon whether the pressure sensed by the sensor 310 is equal to or greater than a predetermined threshold pressure. In this way, the pressure information can be transmitted using a condition that allows more efficient power usage so that the pressure information is transmitted when the sensed pressure is greater than or equal to the predetermined threshold pressure. Alternatively or in addition to generating the pressure information, the internal pressure sensor 310 may be configured to generate pressure indicator information indicative of a predetermined threshold pressure. For example, the pressure indicator information may be generated by the internal pressure sensor 310 when the sensed pressure is greater than or equal to a predetermined threshold pressure, and the pressure indicator information may indicate that that the sensed pressure is greater than or equal to a predetermined threshold pressure rather than indicating a magnitude of the pressure detected by the sensor 310. Similarly, the internal pressure sensor 310 may be programmed for a plurality of predetermined threshold pressure values, so that first pressure indicator information is generated for transmission when the sensed pressure is equal to or greater than a first predetermined threshold pressure and less than a second predetermined threshold pressure, and second pressure indicator information is generated for transmission when the sensed pressure is equal to or greater than the second predetermined threshold pressure and less than a third predetermined threshold pressure. Therefore, the wireless communication unit 220 can be configured to transmit at least one of the pressure information and the pressure indicator information for use by a processing device for controlling one or more processing operations.

The control device 200 optionally comprises one or more internal pressure sensitive switches 320 configured to be actuated when at least a predetermined pressure is applied to the elastically deformable portion of the exterior surface of the control device 200. The internal switch 320 is, by default, biased towards an open state using biasing means (such as a biasing spring or other suitable means). The internal switch 320 is arranged so as to move to the closed state when at least a predetermined pressure is applied to the elastically deformable portion of the exterior surface of the control device 200 which overcomes the biasing force of the biasing means. In this way, information generated when the closed state of the internal switch 320 is indicative that a current pressure applied to the elastically deformable portion of the exterior surface is greater than or equal to a predetermined pressure. The control device 200 may comprise a plurality of the internal pressure sensitive switches 320 distributed at different locations within the control device 200 each operable to be actuated when a predetermined pressure is applied thereto due to deformation of a portion of the exterior surface.

Hence, in some embodiments of the disclosure the control device 200 may have any of the following possible configurations:

One or more sensors 210, the wireless communication unit 220, an exterior surface having no user-actuated input, no internal pressure sensor 310 and no internal pressure sensitive switch 320. In this case, the control device 200 may be used for providing user inputs to a processing device solely in dependence upon the tracking information. The control device 200 may be moved by the user and changes in the 3D position and/or 3D orientation indicated by the tracking information may be used for providing gesture-based inputs for a computing device;

One or more sensors 210, the wireless communication unit 220, an exterior surface having no user-actuated input, and at least one of the internal pressure sensor 310 and the internal pressure sensitive switch 320 for sensing pressure applied to an elastically deformable portion of the exterior surface. In this way, pressure information can be transmitted in addition to the tracking information, for use in controlling one or more processing operations. For example, a squeeze of the external surface by a user can be detected and indicated by the pressure information (indicating at least one of a magnitude of the sensed pressure or whether the sensed pressure is equal to or greater than a threshold pressure value) and the pressure information may be used for providing a user input for a computing device;

One or more sensors 210, the wireless communication unit 220, an exterior surface having at least one user-actuated input but no more than three user-actuated inputs, no internal pressure sensor 310 and no internal pressure sensitive switch 320. In this way, information associated with a user-actuated input on the exterior surface can be transmitted by the wireless communication unit 320 in addition to the tracking information, for use in controlling one or more processing operations;

One or more sensors 210, the wireless communication unit 220, an exterior surface having at least one user-actuated input but no more than three user-actuated inputs, and at least one of the internal pressure sensor 310 and no internal pressure sensitive switch 320. In this way, information (also referred to as user-actuated input information) associated with a user-actuated input on the exterior surface can be transmitted by the wireless communication unit 320 in addition to the pressure information associated with the internal pressure sensor 310 and/or the internal pressure sensitive switch 320 and the tracking information, for use in controlling one or more processing operations.

As explained above, the control device 200 may comprise a plurality of respective internal pressure sensitive switches 320. In some embodiments of the disclosure, the control device 200 is a handheld device having an exterior surface that has a cubic or substantially cubic shape, and a respective internal pressure switch 320 is associated with each face of the exterior surface of control device 200, and when a respective face of the control device 200 is resting on a surface a weight of the control device 200 is sufficient to overcome the biasing force of the biasing means for the internal pressure switch 320 associated with the respective face to cause the internal pressure switch 320 to adopt a closed state. Consequently, the internal pressure switch 320 associated with the face of the cube on which the device 200 is resting is automatically forced into a closed state due to the weight of the device 200 and the generated pressure information indicative of the closed state is transmitted by the wireless communication unit 220. Hence, the pressure information can be automatically generated to indicate a face of the cube that is in contact with an external surface upon which the control device 200 is resting and/or being pressed against, and more generally indicates the physical arrangement of the cube with respect to the surface. For example, identification information (e.g. an ID value) may be associated with the respective pressure information for each of the plurality of internal pressure sensitive switches 320 so as to distinguish between the switches. The pressure information thus provides an indication of the physical arrangement of the cube, from which at least a downwards facing face of the cube (the face resting on the surface) and an upwards facing face of the cube can be derived. Similarly, a face of the cube may be struck by a user's hand (as an example of an external object) or another object and the generated pressure information indicates the face that has been struck.

Hence more generally, in some embodiments of the disclosure the control device 200 has an exterior surface having a shape that is cubic or substantially cubic, and the control device 200 is configured to generate pressure information indicative of a respective face of the exterior surface that is in contact with an external object. In particular, the pressure information may be indicative of a respective face of the exterior surface upon which the control device 200 is resting.

The exterior surface having the cubic or substantially cubic shape (e.g. a truncated cube having one or more truncated vertices) may further comprise one or more optically detectable markers (e.g. passive markers or active markers such as an LED). For example, one or more faces of the cube may have a respective colour and/or a respective symbol thereon, as an example of a passive marker for that face. A user may thus provide a user input by placing (or dropping) the device 200 on a surface (such as a table or a floor) to provide a user input corresponding to a face of the cube. Specifically, the user may place the device 200 on a surface to provide a user input corresponding to the visual marker on the upwards facing surface of the cube that is facing upwards and thus viewable by the user. Therefore, when a first face of the cube is brought into contact with an external surface, a user input associated with a face that is opposite the first face of the cube may be provided by the control device 200.

Specifically, the respective internal pressure switch 320 associated with the face of the cube that is brought into contact with the external surface is configured to be actuated to adopt a closed state when the face of the cube that is brought into contact with the external surface, and the respective internal pressure switch 320 (or circuitry associated with the respective internal pressure switch 320) is configured to generate pressure information, in which the pressure information comprises identification information indicative of the respective internal pressure switch 320 having the closed state. The identification information indicative of the respective internal pressure switch 320 is mapped to an input associated with the marker on the face of the cube that is opposite the contacted face so that the identification information is used to provide a user input corresponding to the upwards facing face of the cube. For example, the control device 200 itself may use a look-up table to map an internal pressure switch to a function of an opposing face of the cube or such a look-up table may be used by a recipient processing device that receives information from the control device 200.

For example, a function of a video game such as a sprint function for an in-game character may be associated with the visual marker "X" on one of the faces. The user may place and optionally leave the device 200 on a surface (e.g. a table surface) so as to bring a face opposite to the face having the marker "X" into contact with the surface and thereby use the sprint function in an executing video game application. In this way, the user input associated with the marker on the upwards facing face can be provided based on contact with the downwards facing face. In some examples, the control device 200 may be used in an interactive video game so that a user drops, rolls or throws the device 200 and a function associated with the upwards facing face (which is inferred by the detection of the contact face of the cube) is used to update one or more processing operations for the video game. In this way, the control device 200 could be used in a game of chance with each face having a different function so that an upwards facing face of the control device 200 is inferred from the pressure information and a corresponding input for the upwards facing face is used for controlling a processing operation.

Whilst it is expected that the user generally prefers to look at the face of the cube having the desired input and thus uses contact with the opposite side of the cube to provide the desired input indicated by the upwards facing face, in some cases the user may instead strike a face of the cube with their hand so as to provide the desired input. Therefore, in some cases, the user input associated with the marker on a first face may be provided based on contact with the first face.

Similarly, instead of resting the cube on a surface the user may instead briefly force the face of the cube opposite to the face having the marker "X" into a surface to use the sprint function (e.g. by banging a side of the cube against a surface which may be a surface of an external object or a part of their body). In this case, the user may still grip some of the other sides of the cube, which can be sensed by the other internal pressure switches 320 associated with those faces. In this case, the pressure information indicating that a respective face was brought into contact for less than a predetermined period of time (e.g. less than 1 second or less than 2 seconds) can be used to infer that the user intended to provide the user input using that respective face. Alternatively or in addition, the pressure information generated by the internal pressure sensor 310 may also be used to determine whether the pressure applied to the respective face is equal to or greater than a threshold pressure value to determine whether the user intended to provide the user input using that respective face. As explained above, instead of using a respective face to provide an input corresponding to a marker on an opposite face, the user may instead strike a given face with their hand to prove the input corresponding to the marker on that face, and pressure information indicative of contact with the given face for less than a predetermined period of time (and optionally indicating at least a threshold amount of pressure for that face) can be used to determine that the user intended to provide the user input for that given face.

Whilst the above user input techniques refer to using respective faces of a cube, it will be appreciated that the control device 200 may have an exterior surface having a different number of faces (e.g. a number of faces in the range 4-20) so as to associate a different user input with each face.

In some examples, a plurality of user inputs may be associated with a respective face of the exterior surface using at least one of the internal pressure sensor 310 and the internal pressure sensitive switch 320. For example, a first user input may be provided when a single contact is detected for a respective face and a second user input, different from the first user input, may be provided when a double contact is detected for the respective face. For example, a condition such as detecting two contacts for a given face within a predetermined period of time (e.g. 1 second) may be used to distinguish the second user input from two successive first user inputs.

Referring now to FIG. 4, in embodiments of the disclosure the control device 200 comprises a power receiving unit 410 configured to wirelessly receive power and a chargeable battery 420 connected to the power receiving unit 410 and configured to store the received power. The power receiving unit 410 is configured to wirelessly receive power from one or more wireless charging apparatuses. A wireless charging apparatus typically comprises a plurality of conducting wires each configured to carry a respective alternating current signal and to generate a time-varying magnetic flux. A conducting wire carrying an alternating current signal will emit a time varying electromagnetic signal comprising an electric field component and a magnetic field component, for which the electric field arises in accordance with Gauss's law, and the magnetic field arises due to the movement of charges with respect to time (i.e. currents). Hence a wire carrying an alternating current signal will emit a time varying electromagnetic signal having magnetic field lines represented by concentric circles (determined by Ampere's law) around the current carrying wire. The magnitude of the magnetic field is dependent on the amplitude of the current signal carried by the wire and the strength of the magnetic field decreases with radial distance from the wire. An oscillating magnetic field can thus be emitted by the conducting wire in the form of lines of magnetic flux. The changes in magnetic flux (time-varying magnetic flux) generated by the conducting wire can propagate through space and exert a force on an electrical charge thereby causing motion of the electrical charge, which can give rise to an electromotive force and current flow in an external circuit, thereby achieving wireless transmission of power to an external circuit.

The power receiving unit 410 is thus configured to wirelessly receive power transmitted by the charging apparatus when located within a predetermined distance of the wireless charging apparatus such that the time-varying magnetic flux induces a current in the power receiving unit 410. The power receiving unit 410 comprises one or more inductive elements such as one or more inductions coils for wirelessly receiving the power. The chargeable battery 420 may use any suitable battery technology. For example, the chargeable battery 420 may for example be a lithium-ion battery. Other suitable rechargeable battery technologies are also considered and the chargeable battery 420 may or may not be replaceable.

Hence more generally, in some embodiments of the disclosure the control device 200 comprises at least one power receiving unit 410 and at least one chargeable battery 420, and energy stored by chargeable battery 420 is used to power the one or more sensors 210 and the wireless communication unit 220 as well as other optional components that may be provided, such as the components shown in FIG. 3.

The control device 200 can thus be wirelessly chargeable by placing the control device 200 within a predetermined distance of a charging apparatus. The charging apparatus may comprise a surface including one or more portions each shaped to receive a portion of the exterior surface of a control device 200. For example, the control device 200 may have an exterior surface having a shape that is spherical, and the surface of the charging apparatus may comprise one or more recesses (e.g. hemispherical recesses) for receiving a portion of the spherical exterior surface to thereby hold the control device 200 at a position on the surface during wireless charging. Similarly, the control device 200 may have an exterior surface having a shape that is cubic in which case the use of a recess may not be required, however, the use of one or more square shaped recesses with a depth of between 0.5 cm and 3 cm may be beneficial for indicating to a user where best to position the control devices 200 for optimal wireless charging.

Hence, in some embodiments of the disclosure a system comprises one or more of the control devices 200 as shown in FIG. 4, and a charging apparatus for wirelessly transmitting power to the one or more control devices 200. The charging apparatus may comprise a surface suitable for receiving a plurality of the control devices 200 so that a plurality of the control devices 200 can be simultaneously charged.

As explained above, the chargeable battery 420 may be connected to the power receiving unit 410 and configured to store the received power to enable wireless charging of the control device 200. Alternatively or in addition, the control device 200 may comprise one or more charging ports on the external surface such as a USB charging port for enabling wired charging of the chargeable battery 420.

In some cases, the chargeable battery 420, the power receiving unit 410 and the associated circuitry may be enclosed or encapsulated by the exterior surface (which may for example be partially or entirely made of an elastically deformable material) thus potentially preventing wired charging of the control device 200. In such cases, the use of wireless charging can allow a construction of the control device 200 in which the components shown in FIG. 2a are entirely encapsulated by the material(s) used for the exterior surface. For example, the control device 200 may have a construction in which the one or more sensors 210 and the wireless communication unit 220 are provided within a small plastic-based shell, and the small plastic-based shell is completely surrounded by an elastically deformable material having an exterior surface that is contactable by the user's hand when used as a handheld device. One or more moulds may thus be used during manufacturing.

Figure 5:
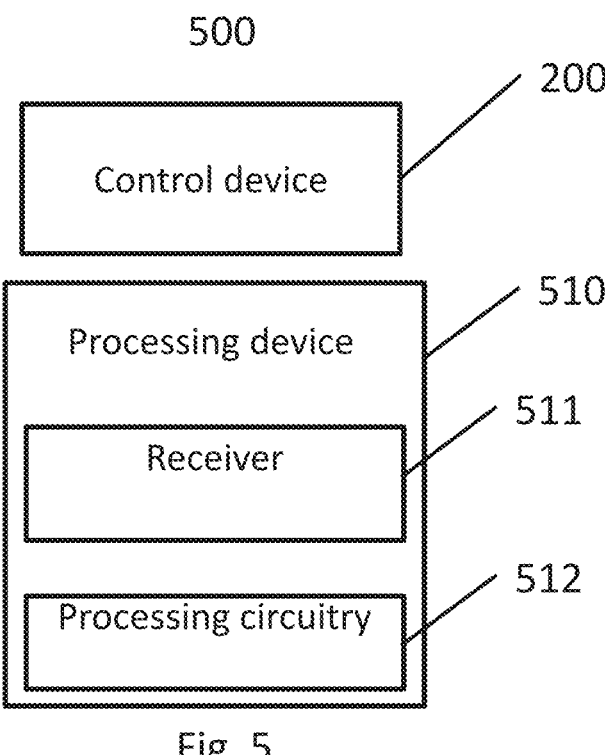
FIG. 5 is a schematic diagram illustrating a data processing system.

Referring now to FIG. 5, in embodiments of the disclosure a processing system 500 comprises one or more of the control devices 200; and a processing device 510 comprising:

a receiver 511 to receive the tracking information for the one or more control devices; and processing circuitry 512 to generate control information for updating one or more processing operations in dependence on the received tracking information.

The processing device 510 may for example be a general purpose computing device or an entertainment device such as a game console. The wireless communication unit 220 of the control device 200 is configured to transmit tracking information indicative of the detected motion and the tracking information is received by the receiver 511.

In some examples, the wireless communication unit 212 for a given control device 210 is configured to transmit the tracking information for the given control device 210 directly for reception by the processing device 220 without the use of any intervening processing devices. Alternatively, in other examples the wireless communication unit 212 is configured to transmit the tracking information for the given control device 210 for reception by the processing device 220 using one or more intermediate devices. For example, in the system 500, the processing device 510 may be an entertainment device (such as a game console, e.g. Sony® PlayStation® 5) and a given control device 200 may transmit the tracking information to another device (such as a user's smartphone device and/or a head-mountable display (HMD) device worn on a user's head or a so-called "break-out box" that may be used in conjunction with an HMD) which then communicates the tracking information to the processing device 510 via a wired or wireless communication (e.g. Bluetooth® or Wi-Fi®). As discussed in more detail later, for the system 500 comprising a plurality of control devices 200, a respective control device 200 may act as a so-called 'master device' representing a communication hub for at least one other respective control device 200, so that the master device receives tracking information for the at least one other control device 200 and wirelessly communicates the received tracking information (in addition to wirelessly communicating its own tracking information) either directly to the processing device 220 or via one or more intermediate processing devices.

In the following discussion, unless specified otherwise, references to the system 500 comprising a plurality of control devices 210 refer to each of the plurality of control devices 210 being the same (i.e. having the same capabilities and having a same or at least similar appearance). In some cases, the system 200 comprises a plurality of control devices 210 including one or more control devices 210 having a first capability and/or appearance and one or more control devices 210 having a second capability and/or appearance. For example, a first control device 200 may have an external surface with a spherical or substantially spherical shape, and a second control device 200 may have an external surface with a cubic or substantially cubic shape. This is discussed in more detail later.

The receiver 511 is configured to receive the tracking information for one or more control devices 200, and the processing circuitry 512 (e.g. comprising one or more CPUs) is configured to generate control information in dependence on the received tracking information, in which the control information is suitable for use in updating one or more processing operations. The control information may be used as an input for an executing application, such as a video game or a simulation, to update one or more processing operations associated with progressing the executing application. As explained previously, in some examples the control information may be used as an input for an executing video game application to cause a player character to perform a spring function (or another similar function such as a jump or shooting function) within the video game or as part of an exercise in an exercise routine of an interactive application. Hence, in some examples the processing circuitry 512 is configured to generate the control information and to update one or more processing operations for a video game application using the control information. In this way, the user is able to interact with an executing video game application using at least tracked movements of one or more of the control devices 200.

In addition to the receiver 511 receiving the tracking information, the receiver 511 may optionally receive information associated with a user-actuated input on the exterior surface of the control device 200. The receiver 511 can thus be configured to receive the tracking information and user-actuated input information associated with at least one user-actuated input on the exterior surface of the control device 200, and the processing circuitry 512 can be configured to generate control information in dependence upon the tracking information and the user-actuated input information. For example, a user holding the control device 200 may perform a gesture using their hand to thereby move the control device 200 and also provide an input using a digit (e.g. an index finger) to press a button on the exterior surface, and the tracking information received by the receiver is indicative of the detected motion with respect to at least three spatial axes and the user-actuated input information is indicative of the button press on the button.

Therefore, both the button press and the gesture can be used for generating control information for updating one or more processing operations.

Similarly, the receiver 511 can optionally be configured to receive the pressure information generated by at least one of the internal pressure sensor 310 and the internal pressure sensitive switch 512 for and the processing circuitry 512 can be configured to generate control information in dependence upon the pressure information.

In some embodiments of the disclosure, the system 500 comprises a plurality of the control devices 200, wherein each control device 200 is configured to transmit the tracking information indicative of the detected motion for that respective control device.

The system 500 may comprise two respective control devices 200 so that a first control device 200 is used by one hand of a user and a second control device 200 is used by another hand of the user. The first and second control devices 200 may optionally include attachment means on their external surfaces for connecting to one or more straps for attaching the control device 200 to the user's hand. Alternatively or in addition, two respective control devices 200 may similarly be attached to other body parts such as the user's upper and/or lower arms.

In some examples, the system 500 may comprise three respective control devices 200. For example, a first control device 200 and a second control device may be held or worn by a user's left and right hands, respectively, and a third control device 200 may be worn on the user's head for tracking head movements. In this case, each of the control devices 200 may have the same capabilities. The number of control devices 200 is not particularly limited. For example, the system 500 may in some cases comprise 10, 20, 24, or 32 respective control devices 200 for allowing the control devices 200 to be used cooperatively to play an interactive video game expected by the processing device 510, such as checkers or chess or other similar games.

In some embodiments of the disclosure, the processing circuitry 512 is configured to update one or more of the processing operations to control an application so that control of the application is performed by user interaction with the plurality of the control devices 200 acting cooperatively. The user may interact with a plurality of control devices 200 to use the plurality of control devices 200 together as a group of cooperating control devices for controlling the application. For example, tracking information for a first control device may be used for controlling a first function associated with the application and user-actuated input information for a second control device may be used for controlling a second function associated with the application. In particular, a user may perform a gesture using the first control device and then perform an input with respect to a user-actuated input of the second control device so as to use both of the control devices to control the application. The first control device may be used for moving a cursor (or similar graphical object) and the second control device may be used to provide a selection input using the cursor. Alternatively or in addition, as explained previously, first tracking information for a first control device may be used for controlling a left limb of an avatar (e.g. left arm) and second tracking information for a second control device may be used for controlling a right limb of the same avatar (e.g. right arm) such that the two control devices can be used cooperatively to allow the avatar to pick up an in-game object.

In some embodiments of the disclosure, at least one of the control devices 200 is a master device configured to receive the tracking information for another control device 200 and to transmit the tracking information for the another control device 200 for reception by the processing device 510. In the case of the system 500 comprising a plurality of control devices 200, rather than each control device individually communicating with the processing device 510 (directly or indirectly via another device), at least one of the control devices 200 may act as a master device so as to receive information (tracking information as well as optionally pressure information and user-actuated input information when present) from one or more of the plurality of control devices 200 and then wirelessly transmit the received information for reception by the processing device 510. This can beneficially reduce the number of control devices 200 performing communication with the processing device 510 or an intermediate device, thereby reducing potential interference. In addition, this can also be beneficial for reducing power consumption for one or more of the control devices 200 by permitting communication with a nearby master device instead of a further away device, and thereby reducing power consumption for the wireless communication unit 220. Consequently, the plurality of control devices 200 may comprise: at least one control device 200 that is a master device; and at least one other control device 200 configured to transmit tracking information only to the master device.

In some embodiments of the disclosure, the processing device 510 is configured to receive the tracking information for the control devices 200 and to interpret the received tracking information according to either a first mode or a second mode. The tracking information for the plurality of control devices 200 is received by the receiver 511 and can be interpreted using either a first mode of interpretation to generate first control information or a second mode of interpretation to generate second control information. Therefore for the same received tracking information, the processing circuitry 512 can generate either first or second control information for updating one or more control operations differently depending on the mode.

In some embodiments of the disclosure, the processing device 510 is configured to interpret the received tracking information according to the first mode to interpret the tracking information for the control devices 200 as a plurality of respective inputs, and wherein the processing device 510 is configured to interpret the received tracking information according to the second mode to interpret the received tracking information for the control devices as from a single input device.

In the first mode, the tracking information for the control devices 200 is interpreted as a plurality of respective inputs such that respective control information is generated for the tracking information for each control device 200. Hence, in the first mode each of the control devices 200 can be controlled to provide an individual (distinct) input using that control device 200. For example, a first control device 200 may be used to control movement of a first avatar in a video game, and a second control device 200 may be used to control movement of a second avatar in a video game. Alternatively or in addition, one control device 200 may be used to control movement of a given limb (e.g. left arm) of the first avatar and another control device 200 may be used to control movement of another limb (e.g. right arm) so that the two limbs can be independently controlled by a user using the two control devices 200 to provide respective inputs. Consequently, the information (at least the tracking information) for a first control device 200 can be interpreted as a first respective user input and used to generate first control information and the information (at least the tracking information) for a second control device 200 can be interpreted as a second respective user input (separate from the first respective user input) and used to generate second control information.

In the second mode, the information (at least the tracking information) for the control devices 200 is interpreted as a single collective input for generating the control information. For example, the control devices 200 may be arranged at positions relative to each other (e.g. by placing one or more of the devices on a surface and/or holding one or more of the devices at a position), and a relative arrangement of the control devices 200 (such as a shape or pattern formed by the positions of the control devices 200) as a collective may be interpreted as a single input such that the control devices 200 together act as a single input device. Therefore, in the second mode the control devices 200 can be used collectively by a user such that the tracking information for the control devices 200 is interpreted as a single input device. In a simplest case, two respective control devices can be arranged on a surface (or held relative to each other) and a distance between the two control devices can be interpreted as a single input. For example, two such control devices (e.g. two cube controllers) may be positioned by a user to control a processing operation such as a zoom function for either a video game or a web browser application based on the distance between the devices, as indicated by the tracking information. Alternatively, a greater number of devices may similarly be used and different shapes and/or different geometric sizes for different shapes may similarly be interpreted as a single input. Consequently, different user inputs may be obtained by changing the positions of the plurality of control devices 200 relative to each other.

Hence more generally, the processing 510 can be configured to interpret the received tracking data for the control devices as a single input so that the processing circuitry generates control information in dependence upon the relative positions of each of the plurality of control devices.

In other examples, two or more control devices 200 may be used together as a combined controller by connecting two of the devices and the received tracking information may be interpreted by the processing device 510 as a single input. In some examples, two or more control devices 200 may be releasably connected to form a combined control device that comprises at least two of the control devices 200. As explained previously, the respective control devices 200 may each have a structure on the external surface for coupling with a strap or similar attachment means. More generally, one or more of the control devices 200 may comprise one or more structures on the external surface for mechanically engaging a corresponding structure on an external surface of another control device 200, such as one or more grooves on an external surface shaped to receive an element on the external surface of another device 200. Hence, two or more control devices 200 can be connected and may be used by a user together as a combined handheld control device.

For example, as described previously the control device 200 may take the form of a cube control device having a respective user input associated with each face of the cube thus providing six possibilities for providing the user input. In some cases, two or more such control devices can be connected to form a combined control device comprising two or more control devices 200 and the tracking information transmitted by the two or more devices 200 can be interpreted according to the second mode to interpret the information as a single input.

In some embodiments of the disclosure, the processing device 510 is configured to select one of the first mode and the second mode in dependence upon at least one of a user input indicative of a selection by a user and one or more properties of the received tracking information. In some cases, a user input indicative of a selection by the user of one of the first mode and the second mode is received for specifying a mode to be used by the processing device 510. The user may for example provide an input with respect to a graphical user interface displayed by a display device associated with the processing device 510 to select the first mode or the second mode. For example, one or more gestures performed using a control device 200 and/or one or more user-actuated inputs of a control device 200 may be used to provide the selection input. Alternatively or in addition, a predetermined gesture may be associated with a selection of the first mode and another predetermined gesture may be associated with a selection of the second mode such that the tracking information is used by the processing device 510 to select the mode. Alternatively or in addition, a user may hold a user-actuated input (e.g. a button) of a given control device 200 for a predetermined amount of time (e.g. 5 seconds) to switch from a current mode, which is either the first mode or the second mode, to the other mode.

Alternatively or in addition, one or more properties of the tracking information received by the processing device 510 may be used so that the processing device 510 automatically selects one of the first mode and the second mode. Therefore, a property of the tracking information such as a number of respective control devices 200 in use may be used to select the mode. For example, in response to receiving tracking information for at least a predetermined number of respective control devices (e.g. 10 or more control devices) the processing device 510 may automatically select the second mode. For example, a set of control devices 200 may be used to play a board game such as chess or checkers. In response to receiving tracking information for at least a predetermined number of respective control devices, it can be inferred that a certain type of board game is to be played using the devices. Consequently, in this case the second mode can be automatically selected so that the relative arrangement of the set of control devices 200 is interpreted as a single input for updating an interactive application. The processing device 510 may be configured to execute an interactive application for a board game so as to display one or more images of a virtual chess board (or checkers board) having pieces arranged thereon according to the relative arrangement of the set of control devices 200.

In some embodiments of the disclosure, the processing device 510 is configured to select one of the first mode and the second mode in dependence upon a separation distance between a first control device 200 and a second control device 200 indicated by the received tracking information. The tracking information is indicative of a separation distance between at least the first and second control devices 200 and in response to a separation distance that is less than a predetermined threshold distance the processing device 510 can be configured to select the second mode for interpreting the tracking information from the first and second control devices 200. In some examples, the system 500 may comprise N respective control devices 200 (where N is an integer that is greater than two and less than fifty), and the tracking information for the N respective control devices may be used to identify a separation distance between the two control devices 200 having the largest separation distance, and to automatically select the second mode when the separation distance is less than a predetermined threshold distance so as to interpret the tracking information for N respective control devices 200 according to the second mode. For example a value for the predetermined threshold distance such as X metres (where X is a value in the range 0.1 to 3 metres) may be used, such that when the plurality of control devices 200 are each arranged within X metres of each other (which is typically the case when the devices 200 are to be used for a type of board game such as chess or checkers) the second mode is automatically selected for interpreting the tracking information for the control devices 200. Alternatively or in addition, the processing device 510 may use the tracking information to identify a shape or a pattern associated with the relative positions of the plurality of control devices 200 (such as a pattern associated with an arrangement of chess pieces or checkers pieces at the start of a game), and in response to detecting a predetermined shape or pattern the second mode can be automatically selected.

In some embodiments of the disclosure, each control device 200 is configured to transmit the tracking information for that control device 200, the transmitted tracking information comprising identification information for that control device. Each of the control devices 200 comprises the wireless communication unit 220 for transmitting the tracking information detected by the one or more sensors 210 for that control device 200, and each control device 200 is configured to transmit unique identification information as part of the tracking information for identifying a control device 200 with respect to another control device 200. The identification information may comprise an ID value which for example may include one or more numbers for uniquely identifying a respective control device 200. In this way, the processing device 510 can receive tracking information for a plurality of control devices 200 and the tracking information for each respective control device 200 can be individually identified.

Figure 6:
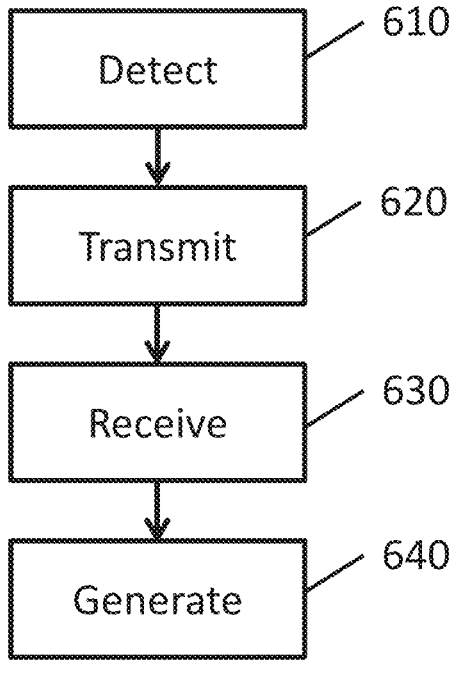
FIG. 6 is a schematic diagram illustrating a data processing method.

Referring now to FIG. 6, in embodiments of the disclosure a data processing method comprise:

detecting (at a step 610), by one or more sensors 210 of a respective control device 200, motion of the control device in at least three spatial axes;

transmitting (at a step 620), by the respective control device, tracking information indicative of the detected motion;

receiving (at a step 630), by a processing device 510, the tracking information; and generating (at a step 640) control information for updating one or more processing operations in dependence on the received tracking information, wherein the data processing method is performed using one or more control devices 200, and wherein each control device has an exterior surface having no more than three user-actuated inputs.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

Thus any required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A processing system, comprising:
a plurality of control devices each including: (i) one or more sensors to detect motion of the control device in at least three spatial axes; (ii) a wireless communication unit to transmit tracking information indicative of the detected motion; and (iii) an exterior surface having no more than three user-actuated inputs; and
a processing device comprising:
a receiver to receive the tracking information for the plurality of control devices; and
processing circuitry to:
select, based on at least one of a user input indicative of a selection by a user and one or more properties of the received tracking information, one of a first mode of generating control information from the received tracking information or a second mode of generating control information from the received tracking information;
interpret the received tracking information according to the selected mode of generating control information from the received tracking information; and
generate, using the selected mode of generating control information from the received tracking information, control information for updating one or more processing operations in dependence on the received tracking information.

2. The processing system according to claim 1, wherein the exterior surface of a given control device of the plurality of control devices comprises:
i. no more than two user-actuated inputs;
ii. no more than one user-actuated input; or
iii. no user-actuated input.

3. The processing system according to claim 1, wherein a control device of the plurality of control devices is either a handheld control device or a wearable control device.

4. The processing system according to claim 1, wherein a control device of the plurality of control devices is a handheld control device and the exterior surface has a shape that is one of:
i. spherical or substantially spherical;
ii. cubic or substantially cubic; or
iii. ovoidal.

5. The processing system according to claim 1, wherein at least a portion of the exterior surface comprises an elastically deformable portion for being elastically deformed when gripped by a hand of a user.

6. The processing system according to claim 5, wherein a control device of the plurality of control devices comprises one or more of:
i. an internal pressure sensor for sensing pressure applied to the elastically deformable portion of the exterior surface of the control device; and
ii. one or more internal pressure sensitive switches configured to be actuated when at least a predetermined pressure is applied to the elastically deformable portion of the exterior surface of the control device.

7. The processing system according to claim 1, wherein a control device of the plurality of control devices comprises a power receiving unit configured to wirelessly receive power and a chargeable battery connected to the power receiving unit and configured to store the received power.

8. The processing system according to claim 1, in which the processing circuitry is configured to update one or more of the processing operations to control an application so that control of the application is performed by user interaction with the plurality of the control devices acting cooperatively.

9. The processing system according to claim 1, wherein at least one of the control devices is a master device configured to receive the tracking information for another control device and to transmit the tracking information for the other control device for reception by the processing device.

10. The processing system according to claim 1, wherein the processing device is configured to interpret the received tracking information according to the first mode to interpret the tracking information for the control devices as a plurality of respective inputs, and wherein the processing device is configured to interpret the received tracking information according to the second mode to interpret the received tracking information for the control devices as from a single input device.

11. The processing system according to claim 1, wherein the processing device is configured to select one of the first mode or the second mode in dependence upon a separation distance between a first control device and a second control device indicated by the received tracking information.

12. The processing system according to claim 1, wherein each control device is configured to transmit the tracking information for that control device, the transmitted tracking information comprising identification information for that control device.

13. The processing system according to claim 1, wherein the processing circuitry is configured to combine (i) optical tracking information for at least one of the plurality of control devices received from one or more camera devices and (ii) the received tracking information.

14. A data processing method comprising:
detecting, by one or more sensors of a respective control device, motion of the control device in at least three spatial axes;
transmitting, by the respective control device, tracking information indicative of the detected motion;
receiving, by a processing device, the tracking information;
selecting, by the processing device and based on at least one of a user input indicative of a selection by a user and one or more properties of the received tracking information, one of a first mode of generating control information from the received tracking information or a second mode of generating control information from the received tracking information;

interpreting, by the processing device, the received tracking information according to the selected mode of generating control information from the received tracking information; and generating, using the selected mode of generating control information from the received tracking information, control information for updating one or more processing operations in dependence on the received tracking information, wherein the data processing method is performed using one or more control devices, and wherein each control device has an exterior surface having no more than three user-actuated inputs.

15. A non-transitory machine-readable storage medium which stores computer software which, when executed by a computer, causes the computer to perform a data processing method comprising:

detecting, by one or more sensors of a respective control device, motion of the control device in at least three spatial axes;

transmitting, by the respective control device, tracking information indicative of the detected motion;

receiving, by a processing device, the tracking information;

selecting, by the processing device and based on at least one of a user input indicative of a selection by a user and one or more properties of the received tracking information, one of a first mode of generating control information from the received tracking information or a second mode of generating control information from the received tracking information;

interpreting, by the processing device, the received tracking information according to the selected mode of generating control information from the received tracking information; and generating, using the selected mode of generating control information from the received tracking information, control information for updating one or more processing operations in dependence on the received tracking information, wherein the data processing method is performed using one or more control devices, and wherein each control device has an exterior surface having no more than three user-actuated inputs.

* * * * *